(12) United States Patent
Miyata

(10) Patent No.: US 7,846,416 B2
(45) Date of Patent: Dec. 7, 2010

(54) SOIL CONDITIONER

(75) Inventor: Shigeo Miyata, Kitakyushu (JP)

(73) Assignee: Kabushiki Kaisha Kaisui Kagaku Kenkyujo, Fukuoka (JP)

( * ) Notice: Subject to any disclaimer, the term of this patent is extended or adjusted under 35 U.S.C. 154(b) by 1383 days.

(21) Appl. No.: 11/263,972

(22) Filed: Nov. 2, 2005

(65) Prior Publication Data
US 2006/0100104 A1 May 11, 2006

(30) Foreign Application Priority Data
Nov. 5, 2004 (JP) ............................. 2004-321739

(51) Int. Cl.
| | |
|---|---|
| C01F 11/02 | (2006.01) |
| C01F 5/00 | (2006.01) |
| C01G 53/04 | (2006.01) |
| C01G 51/04 | (2006.01) |
| C01G 49/02 | (2006.01) |
| C01G 45/02 | (2006.01) |
| C01G 9/02 | (2006.01) |
| A01N 25/00 | (2006.01) |
| A01N 59/06 | (2006.01) |
| A01N 3/00 | (2006.01) |

(52) U.S. Cl. .................... 423/594.2; 71/903; 423/594.4; 423/594.6; 423/594.14; 423/594.16; 423/599; 504/113; 504/116.1; 504/187; 514/769

(58) Field of Classification Search .............. 423/592.1, 423/593.1, 594.1, 594.2, 579, 594.4, 594.6, 423/594.14, 594.16, 599; 504/113, 152, 504/116.1, 187; 71/903; 514/769
See application file for complete search history.

(56) References Cited

U.S. PATENT DOCUMENTS

| | | | | |
|---|---|---|---|---|
| 5,326,549 | A | * | 7/1994 | Miyata ..................... 252/519.1 |
| 6,297,193 | B1 | * | 10/2001 | Miyata et al. ............... 504/152 |
| 6,656,382 | B1 | | 12/2003 | Kuhlmann et al. |
| 2004/0219089 | A1 | | 11/2004 | Kuhlmann et al. |

FOREIGN PATENT DOCUMENTS

| | | |
|---|---|---|
| DE | 197 43 606 | 4/1999 |
| WO | 01/55057 | 8/2001 |

OTHER PUBLICATIONS

Extended European Search Report dated Jun. 10, 2010 in corresponding European Patent Application No. 05256854.0.
Bull, "Development and Evaluation of Layered Double Hydroxides (LDHs) for Nitrate Exchange in Soil," Cuvillier Verlag, Göttingen, pp. 7-22 and 81-101 (Aug. 8, 2001), XP-002583074.
Komarneni et al., "Anionic Clays as Potential Slow-Release Fertilizers: Nitrate Ion Exchange," Journal of Porous Materials, vol. 10, pp. 243-248 (Dec. 1, 2003), XP-001186285.
Torres-Dorante et al., "Use of a Layered Double Hydroxide (LDH) to Buffer Nitrate in Soil: Long-Term Nitrate Exchange Properties under Cropping and Fallow Conditions," Plant Soil, vol. 315, pp. 257-272 (Aug. 26, 2008), XP-019686597.
Olfs et al., "A New Fertilizer: A Mineral to Release and Adsorb Nitrate," IFA International Workshop on Enhanced-Efficiency Fertilizers, Frankfurt, Germany (Jun. 28-30, 2005), XP-008121395.

* cited by examiner

*Primary Examiner*—Stuart Hendrickson
*Assistant Examiner*—Syed Iqbal
(74) *Attorney, Agent, or Firm*—Wenderoth, Lind & Ponack, L.L.P.

(57) ABSTRACT

A nitrate-nitrogen-reducing agent for a farm product, comprising as an active ingredient a hydroxide solid solution represented by the formula (1), $$[(M_1^{2+})_{1-x}(M_2^{2+})_x]_{1-z}(M^{3+})_z(OH)_2(A^{n-})_{z/n} \cdot mH_2O \qquad (1)$$

wherein $M_1^{2+}$ represents Ca and/or Mg, $M_2^{2+}$ represents at least one essential mineral selected from Fe, Mn, Zn, Cu, Ni and Co, $M^{3+}$ represents at least one trivalent metal, $A^{n-}$ represents an anion having a valence of n, x is a positive number in the range of $0<x<0.5$, m is 0 or a positive number in the range of $0 \leq m<10$, z is a positive number in the range of $0<z<0.4$, and n is a positive number in the range of $1 \leq n \leq 10$,
and/or the formula (2), $$(M_1^{2+})_{1-x}(M_2^{2+})_x(OH)_2 \qquad (2)$$

wherein $M_1^{2+}$, x and $M_2^{2+}$ are as defined in the formula (1).

6 Claims, No Drawings

SOIL CONDITIONER

TECHNICAL FIELD OF THE INVENTION

The present invention relates to an agent for reducing nitrate nitrogen in a farm product such as vegetables and green tea.

PRIOR ARTS OF THE INVENTION

Due to long-time use of nitrogenous fertilizers, the concentration of nitrate nitrogen in a farm product increases to such an extent as to negatively affect human health. The increase in the concentration of nitrate nitrogen increases the risk of causing methemoglobinemia, which possibly induces death in infants. Therefore, as human being ingests vegetables and green teas more, which are said to be inherently good for health, the health is adversely more harmed. However, a method of reducing nitrate nitrogen in farm products has not yet been found so that an effective solution is not attained under the present circumstances.

SUMMARY OF THE INVENTION

It is an object of the present invention to provide an agent capable of largely reducing nitrate nitrogen contained in a farm product which grows in a soil owing to only its addition to the soil.

It is another object of the present invention to provide a soil conditioner which is capable of reducing nitrate nitrogen by a simple working such as spraying or blending over/with a soil once or twice a year.

The present inventor has thought that the cause of the nitrate nitrogen problem lies in change in the quality of a soil caused by long-time use of chemical fertilizers. It is thought that, since only chemical fertilizers have been mainly given to a soil, many of essential minerals which must be present in soil have been exhausted or there has occurred a deviation from a proper ratio between minerals, which has caused unhealthy growing of farm products. Hence, it is thought that, if almost all of minerals essential for soil are given at a proper ratio and in proper concentrations, farm products which grow there are replenished with the minerals, which are active centers of enzyme, and therefore recover the inherent function of enzyme and get their health back. The present inventor has thought that, as a result thereof, nitrate nitrogen can be largely reduced to a safe extent.

On the basis of the above thoughts, the present inventor has contrived a compound which contains, at a proper ratio, most of essential minerals atomically dispersed therein and in addition can gradually release the essential minerals in proper concentrations. The present inventor has conducted many experiments. As a result thereof, the present inventor has found and actualized the effects of the present invention.

The present invention provides a nitrate-nitrogen-reducing agent for a farm product, comprising as an active ingredient a hydroxide solid solution represented by the formula (1),

$$[(M_1^{2+})_{1-x}(M_2^{2+})_x]_{1-z}(M^{3+})_z(OH)_2(A^{n-})_{z/n} \cdot mH_2O \qquad (1)$$

wherein $M_1^{2+}$ represents Ca and/or Mg, $M_2^{2+}$ represents at least one essential mineral, preferably at least two essential minerals, selected from Mn, Fe, Cu, Zn, Ni and Co, preferably at least Fe and Zn, more preferably Fe, Zn and Mn, particularly preferably Fe, Zn, Mn and Cu, $M^{3+}$ represents at least one trivalent et al, preferably at least one member selected from Fe, Mn, Cr and Co, $A^{n-}$ represents at least one anion having a valence of n, preferably at least one anion selected from $I^-$, $Cl^-$, $NO_3^-$, $SO_4^{2-}$, $HPO_4^{2-}$, $HBO_3^{2-}$, $MoO_4^{2-}$, $H(Mo)_7O_{24}^{5-}$, $HVO_4^{2-}$ and $SeO_4^{2-}$, particularly preferably oxygen acid salts of boron and molybdenum such as a boric acid ion $HBO_3^{2-}$ and a molybdic acid ion $MoO_4^{2-}$, x is a positive number in the range of $0<x<0.5$, m is 0 or a positive number in the range of $0 \leq m < 10$, z is a positive number in the range of $0<z<0.4$, and n is an integer of at least 1, preferably an integer of in the range of $1 \leq n \leq 10$, and/or the formula (2),

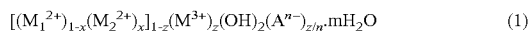

$$(M_1^{2+})_{1-x}(M_2^{2+})_x(OH)_2 \qquad (2)$$

wherein $M_1^{2+}$, x and $M_2^{2+}$ are as defined in the formula (1).

EFFECT OF THE INVENTION

The addition of the hydroxide solid solution of essential mineral to a soil can remarkably reduce nitrate nitrogen in a farm product which grows in the soil.

Furthermore, it is sufficient to add the nitrate-nitrogen-reducing agent of the present invention once or twice a year since the nitrate-nitrogen-reducing agent of the present invention is a sustained-release agent. Therefore, it remarkably saves labor as compared with a general agent which is required to be sprayed every week or every ten days. Owing to watering and/or rainwater, mineral ions of the hydroxide solid solution represented by the formula (1) and/or (2) are gradually dissolved and released in the water in ppm order or lower order. Therefore, when the concentration of mineral exceeds a proper concentration and reaches a high concentration, farm products are not harmed.

The nitrate-nitrogen-reducing agent of the present invention reduces nitrate nitrogen in farm products such as vegetables and green teas to about half or less, inhibits the occurrence of methemoglobinemia and thus is capable of providing safe farm products. Further, the roots of farm products develop and the growth of stalks and leaves is improved so that yield increases. Moreover, the absorptive efficiency of fertilizer is improved, so that it is possible to reduce the fertilizer. In addition, the roots, stalks and leaves become firm so that lodging of farm products by wind can be improved. Further, a taste and a nutrient component such as sugar content and chlorophyll are also improved.

DETAILED DESCRIPTION OF THE INVENTION

The nitrate-nitrogen-reducing agent of the present invention is characterized in that it contains as an active ingredient a hydroxide solid solution of essential minerals, represented by the formula (1) and/or the formula (2), $$[(M_1^{2+})_{1-x}(M_2^{2+})_x]_{1-z}(M_3^{3+})_z(OH)_2(A^{n-})_{z/n} \cdot mH_2O \qquad (1)$$

$$(M_1^{2+})_{1-x}(M_2^{2+})_x(OH)_2 \qquad (2)$$

wherein $M_1^{2+}$ represents Ca and/or Mg, $M_2^{2+}$ represents at least one essential mineral, preferably at least two essential minerals, selected from Fe, Mn, Zn, Cu, Ni and Co, preferably at least Fe and Zn, more preferably Fe, Zn and Mn, particularly preferably Fe, Mn, Zn and Cu, $M^{3+}$ represents at least one trivalent metal, preferably at least one member selected from Fe, Mn, Cr, Al and Co, particularly preferably Fe and/or Mn, $A^{n-}$ represents at least one anion having a valence of n, preferably at least one member selected from $Cl^-$, $I^-$, $NO_3^-$, and oxygen acid salts of sulfur, phosphorus, boron, molybdenum, vanadium and selenium which are essential minerals, such as $SO_4^{2-}$, $HPO_4^{2-}$, $MoO_4^{2-}$, $H(Mo)_7O_{24}^{5-}$, $HVO_4^{2-}$ and $SeO_4^{2-}$, particularly preferably oxygen acid salts of B and Mo, x is a positive number in the range of $0<x<0.5$, preferably

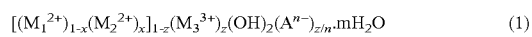

$0.05 \leq x \leq 0.3$, particularly preferably $0.1 \leq x \leq 0.25$, m is 0 or a positive number in the range of $0 \leq m < 10$, z is a positive number in the range of $0 < z < 0.4$, preferably $0.01 \leq z \leq 0.3$, particularly preferably $0.05 \leq z \leq 0.2$, and n is an integer of at least 1, preferably an integer in the range of $1 \leq n \leq 10$.

A mineral selected from Fe, Mn, Zn and Cu, which are essential minerals required in small amounts, and Mo, Se, Ni, Cr, Co and V, which are essential minerals required in very small amounts, is solid-dissolved (atomically dispersed/dissolved) in a crystal of a single hydroxide of Ca or Mg, each of which is an essential mineral required in a relatively large amount, or a composite hydroxide of Ca and Mg, preferably at a proper ratio. Preferably, all of Fe, Mn, Zn and Cu are solid-dissolved. In this case, solubility to water close to the solubility of calcium hydroxide or magnesium hydroxide to water is actualized, that is, slow solubility of small-amount minerals, in other words, sustained release is actualized.

Further, B, Mo, Se, I and V, which are minerals required in extremely small amounts, are poor in metallic nature and thus do not easily enter a metallic portion in a metal hydroxide structure. However, owing to the hydrotalcite structure represented by the formula (1), it is possible to atomically incorporate these minerals in their anionic form together with another mineral into one crystal. For example, an oxygen acid salt can be incorporated as $A^{n-}$ of the formula (1) which is an ion-exchanging anion.

Examples of the above anion include $HBO_3^{2-}$, $H_2BO_3^{-}$, $MoO_4^{2-}$, $H(Mo)_7O_{24}^{5-}$, $SeO_4^{2-}$, $I^-$ and $HVO_4^{2-}$. Oxygen acid salts of B and Mo are particularly preferred.

As the above $A^{n-}$, an anion containing essential mineral required in a large amount, such as $Cl^-$, $NO_3^-$, $SO_4^{2-}$, $SO_3^{2-}$, $HPO_4^{2-}$, $H_2PO_4^-$ or $PO_4^{3-}$, can be incorporated. Further, the above essential minerals in anionic form can be chemically adsorbed to a positively-electrified surface of crystal of metal hydroxide of the formula (1) and/or (2) through the use of their anionic chemical form. Of course, $A^{n-}$ of the formula (1) may be an anion which does not contain an essential mineral, for example, an organic acid ion such as $CO_3^{2-}$ or $CH_3COO^-$.

Essential minerals cause a side effect when they are excessive or deficient. Therefore, it is preferred that the essential minerals are dispersively present in a proper ratio within Ca and/or Mg which are required in large amounts. For that purpose, the range of x which is the amount of $M_2^{2+}$ based on $M_1^{2+}$ is $0 < x < 0.5$, preferably $0.05 \leq x \leq 0.3$, particularly preferably $0.1 \leq x \leq 0.25$. In addition, it is preferred that $M^{2+}$ are contained in the order of Fe>Zn≧Mn>Cu >>Mo, Se, Co, Ni. Further, it is preferred that minerals which are easily oxidized, such as Fe or Mn, are in bivalent state which is an easily absorbable state. Therefore, the range of z is $0 < z < 0.4$, preferably $0.01 \leq z \leq 0.3$, particularly preferably $0.05 \leq z \leq 0.2$.

A preferred ratio of the main minerals in the nitrate-nitrogen-reducing agent of the present invention are as follows, expressed by molar percentage, Ca=64-75%, Mg=12-33%, Mn=1-5%, Fe=5-12%, Cu=0.2-1%, and Zn=2-5%.

The amount of the nitrate-nitrogen-reducing agent of the present invention to be added per m² of soil is 0.1 to 1,000 g, preferably 1 to 200 g, particularly preferably 5 to 100 g.

The nitrate-nitrogen-reducing agent of the present invention may be surface-treated with an anionic surfactant such as a higher fatty acid or an alkaline metal salt of a higher fatty acid or a nonionic surfactant for the purposes of improving resistance to carbonation, diminishing settleability when dispersed in water before use, and strengthening a sustained release property. The amount of the surfactant based on the weight of the nitrate-nitrogen-reducing agent of the present invention is 0.1 to 20%, preferably 0.5 to 10%. The surface treatment can be carried out by a known wet process or a known dry process. Preferably, the surface treatment is carried out by a wet process in which the nitrate-nitrogen-reducing agent of the present invention is dispersed in water to prepare a dispersion, the anionic or nonionic surfactant dissolved or emulsified in water is added to the dispersion with stirring and they are mixed.

The nitrate-nitrogen-reducing agent of the present invention can be produced by a coprecipitation method. For example, it can be produced by adding, to a mixed aqueous solution of water soluble salt(s) of $M_1^{2+}$ and/or $M^{3+}$, an alkaline solution in an amount of at least 1 equivalent based on the water soluble salt(s), and carrying out coprecipitation.

Examples of water-soluble $M_1^{2+}$, $M_2^{2+}$ and/or $M^{3+}$ used include chlorides, nitrates, sulfates, acetates, etc., of Ca, Mg, Fe, Mn, Cu, Zn, etc. The alkali is typically sodium hydroxide, potassium hydroxide, calcium hydroxide, etc.

As another example of the coprecipitation method other than the above-explained example, for example, there is a method in which to a slurry-state dispersion of calcium hydroxide and/or magnesium hydroxide is added a mixed aqueous solution of a water-soluble salt of Mg, Fe, Mn, Cu, Zn, etc., in an amount of less than 0.5 equivalent based on the calcium hydroxide and/or magnesium hydroxide with stirring, and the mixture is allowed to react.

As calcium hydroxide used as a raw material, there may be used slaked lime obtained by baking limestone and then hydrating the baked limestone. As a mixture of calcium hydroxide and magnesium hydroxide, there may be used a hydrate of a baked product of dolomite.

The nitrate-nitrogen-reducing agent of the present invention is used in the form of a powder, a slurry, a granulated body or the like. In view of handling properties and resistance to dusting, the granulated body is preferred. The size of the granulated body is for example 0.5 to 10 mm, preferably 1 to 3 mm. The shape of the granulated body is typically a spherical shape or a columnar shape. Further, when the nitrate-nitrogen-reducing agent of the present invention is used for water culture or the like, it is preferred to use a slurry which has small settleability.

The nitrate-nitrogen-reducing agent of the present invention may be mixed with a known agricultural auxiliary material such as activated soil, diatom earth, mica, zeolite, bentonite, fish meal, activated carbon, bamboo charcoal, pearlite, vermiculite or wood charcoal, for the purpose of dilution and/or neutralization or pH adjustment.

The present invention will be explained more in detail with reference to Examples, hereinafter.

EXAMPLE 1, EXAMPLE 2 AND COMPARATIVE EXAMPLE 1

5 liters of an about-30° C.-hot mixed aqueous solution containing calcium chloride, magnesium chloride, manganese chloride, ferrous chloride, zinc chloride and copper(II) nitrate (Ca=0.7 M/L, Mg=0.15 M/L, Mn=0.02 M/L, Fe=0.10 M/L, Zn=0.025 M/L, Cu=0.005 M/L) was added to 3 liters of about-30° C.-hot 4 M/L sodium hydroxide over 1 minute with stirring and the mixture was allowed to react.

The thus-obtained reaction product was filtered under reduced pressure, followed by washing with water. The washed product was dried with a hot-air dryer at about 100° C. for 20 hours, and then the dried product was pulverized, to obtain a powder. The X-ray diffraction pattern of the powder showed that the powder was a mixture composed of a small amount of hydrotalcite and mainly a calcium hydroxide solid solution.

The powder was subjected to a whole quantity analysis of each element by ICP. $Fe^{2+}$ was quantified according to an absorptiometric method (1,10-phenanthroline method) and $Mn^{2+}$ was quantified according to a chelate titration method. The amount of crystal water was decided from a weight loss at 100° C. to 200° C. in thermal analysis. As a result, the chemical composition was roughly as follows.

$$[(Ca_{0.70}Mg_{0.15})_{0.84}(Fe^{2+}_{0.04}Mn^{2+}_{0.01}Zn_{0.025}Cu_{0.005})_{0.16}]_{0.93}[(Fe^{3+}_{0.06}Mn^{3+}_{0.01})]_{0.07}(OH)_2Cl_{0.7} \cdot 0.28H_2O$$

The above powder and an acid white clay were mixed in a ratio of 10:90, water was added to the mixture, the resultant mixture was kneaded with a kneader, the kneaded mixture was processed with an extruding machine to prepare a columnar pellet having a diameter of about 1.5 mm. The columnar pellet was dried at about 70° C. for 5 hours, and the dried pellet was used for a test of farm products.

Test setting of soil for raising seedlings [g/pot]

TABLE 1

|  | Field soil | Nitrate nitrogen reducing agent | Ammonium sulfate | Calcium super-phosphate | Potassium chloride | Magnesian lime |
|---|---|---|---|---|---|---|
| Research plot 1 (Example 1) | 500 g | 4 g | 0.48 g | 0.60 g | 0.16 g | 0.5 g |
| Research plot 2 (Example 2) | 500 g | 20 g |  |  |  |  |
| Control plot 1 (Comparative Example 1) | 500 g |  |  |  |  |  |

A pot having a surface area of 0.015 m² and containing a soil for raising seedlings alone [Comparative Example 1], a pot having a surface area of 0.015 m² and containing a soil for raising seedlings and 27 g/m² (0.08%) of the nitrate-nitrogen-reducing agent of the present invention obtained by the above process [Example 1], and a pot having a surface area of 0.015 m² and containing a soil for raising seedlings and 133 g/m² (0.4%) of the nitrate-nitrogen-reducing agent of the present invention obtained by the above process [Example 2] as shown in Table 1 were prepared. Three Japanese mustard spinach seedlings after one week from their germination were transplanted in each of these pots. Three weeks later, the Japanese mustard spinach seedlings were measured for nitrate nitrogen, a sugar content, chlorophyll and growing condition. Nitrate nitrogen was measured with an RQ flex, the sugar content was measured with a saccharimeter, and chlorophyll was measured with a chlorophyll tester. [Table 2] shows the results thereof.

Survey results of ingredient contents and growth

TABLE 2

|  | Nitrate nitrogen (ppm) | Sugar content (Brix %) | Chlorophyll | Live weight [g/pot] (aboveground part) | Live weight [g/pot] (underground part) |
|---|---|---|---|---|---|
| Example 1 | 1,450 | 3.0 | 1.20 | 12.5 | 3.9 |
| Example 2 | 1,170 | 3.2 | 1.26 | 13.2 | 4.2 |
| Comparative Example 1 | 3,500 | 2.7 | 1.05 | 11.3 | 3.0 |

When the nitrate-nitrogen-reducing agent of the present invention in an amount of 0.08% was added to the soil, nitrate nitrogen was decreased to half or less. This satisfied 2,000 ppm or less, which is said to be safe. Further, the nitrate-nitrogen-reducing agent of the present invention improved growth of roots (underground part of live weight) and in addition stalks and leaves were firm. This serves to prevent lodging. The sugar content, which relates to taste, was also improved. Therefore, the nitrate-nitrogen-reducing agent of the present invention contributes to a remarkable improvement with regard to nitrate nitrogen and also contributes to the growth of plants and an improvement in the quality of the plants.

EXAMPLE 3

10 liters of an about-30° C.-hot mixed aqueous solution containing magnesium chloride, manganese nitrate, ferrous sulfate and copper(II)nitrate (Mg=0.672 mol, Mn=0.076 mol, Fe=0.192 mol, Zn=0.05 mol, Cu=0.01 mol) and an about-30° C.-hot aqueous solution containing 2 M/L of sodium hydroxide were supplied to a reaction vessel equipped with overflow and having a volume of 2 liters with about-200 ml constant rate pumps at rates of 200 ml/minute, respectively, with stirring. While maintaining a reaction pH between about 10.0 and 10.5, coprecipitation reaction was continuously carried out at about 35 to 37° C. The thus-obtained precipitate was filtered, washed with water, and again dispersed in water. Then, 0.0002 mol of ammonium molybdate: $(NH_4)_6Mo_7O_{24} \cdot 4H_2O$ and 0.4 mol of boric acid $(H_3BO_3)$ were added, and the resultant mixture was homogeneously blended with a stirrer. The mixture was filtered, followed by drying under vacuum at 100° C. for 15 hours, and then pulverization with an atomizer, to obtain a powder.

The above magnesium hydroxide solid solution powder was used for the following farm products test.

Separately, a powder of a solid solution was obtained in the same manner as above except that ammonium molybdate and boric acid were not added. The powder had an X-ray diffraction pattern corresponding to the X-ray diffraction pattern of magnesium hydroxide. Therefore, it was found that the powder was a solid solution. This powder was subjected to elemental analysis. As a result, the chemical composition was roughly as follows.

$$(Mg_{0.89}Mn_{0.025}Fe_{0.064}Zn_{0.017}Cu_{0.003})(OH)_2$$

[Farm Products Test]

About 15 liters, about 7 kg, of a commercially-available culture soil (supplied by Coop, Tsuchi-Ichiban) was added to each of three planters having a size of about 21×55 cm. Two spinach seedlings were transplanted in one of the planters, two Boston lettuce seedlings were transplanted in another one of the planters, and two potherb mustard seedlings were transplanted in the other of the planters. 5 g of ammonium sulfate, 6 g of calcium superphosphate and 1.5 g of potassium chloride as fertilizers were added to each of the planters. 1 g (8.7 g/m$^2$) of the magnesium hydroxide solid solution powder of the present invention was added to each of the planters (Examples 3-1, 3-2 and 3-3). Planters containing the above components other than the magnesium hydroxide solid solution powder were prepared as controls (Comparative Examples 2 to 4). Four weeks later, these seedlings were measured for nitrate nitrogen, a sugar content and chlorophyll. Table 3 shows the results thereof.

TABLE 3

Analysis results of nitrate nitrogen, a sugar content and chlorophyll

| | Farm product | Nitrate nitrogen (ppm) | Sugar content (Brix %) | Chlorophyll |
|---|---|---|---|---|
| Ex. 3-1 | Spinach | 1251 | 10.5 | 67.1 |
| CEx. 2 | Spinach | 2946 | 9.0 | 55.2 |
| Ex. 3-2 | Boston lettuce | 924 | 3.8 | 43.6 |
| CEx. 3 | Boston lettuce | 2238 | 3.4 | 37.9 |
| Ex. 3-3 | Potherb mustard | 875 | 6.7 | 52.0 |
| CEx. 4 | Potherb mustard | 2685 | 6.0 | 41.5 |

Ex. = Example,
CEx. = Comparative Example

What is claimed is:

1. A nitrate-nitrogen-reducing agent for a farm product, comprising as an active ingredient a hydroxide solid solution represented by the formula (1), $$[(M_1^{2+})_{1-x}(M_2^{2+})_x]_{1-z}(M^{3+})(OH)_2(A^{n-})_{z/n} \cdot mH_2O \quad (1)$$

wherein $M_1^{2+}$ represents Ca and/or Mg, $M_2^{2+}$ represents Fe, Mn, Zn, Cu, $M^{3+}$ represents at least one trivalent metal, $A^{n-}$ represents an anion having a valence of n, x is a positive number in the range of 0<x<0.5, m is 0 or a positive number in the range of 0≦m<10, z is a positive number in the range of 0<z<0.4, and n is a positive number in the range of 1≦n≦10, and/or the formula (2), $$(M_1^{2+})_{1-x}(M_2^{2+})_x(OH)_2 \quad (2)$$

wherein $M_1^{2+}$, x and $M_2^{2+}$ are as defined in the formula (1), wherein the nitrate-nitrogen-reducing agent contains Fe in an of from 5 to 12 mol %, Mn in an amount of from 1 to 5 mol %, Zn in an amount of from 2 to 5 mol % and Cu in an amount of 0.2 to 1 mol %.

2. A nitrate-nitrogen-reducing agent according to claim 1, wherein $M_2^{2+}$ represents Fe, Zn, Mn and Cu, and $M^{3+}$ represents Mn and/or Fe.

3. A nitrate-nitrogen-reducing agent according to claim 1, wherein $A^{n-}$ contains oxygen acid salt(s) of B and/or Mo.

4. A nitrate-nitrogen-reducing agent according to claim 1, wherein x is in the range of 0.05≦x≦0.3 and z is in the range of 0.01<z<0.2.

5. A nitrate-nitrogen-reducing agent according to claim 1, wherein $M_2^{2+}$ further represents at least one essential mineral selected from the group consisting of Ni and Co.

6. A method for combining a nitrate-nitrogen-reducing agent for a farm product with soil, wherein the nitrate-nitrogen-reducing agent comprises as an active ingredient a hydroxide solid solution represented by the formula (1), $$[(M_1^{2+})_{1-x}(M_2^{2+})_x]_{1-z}(M^{3+})(OH)_2(A^{n-})_{z/n} \cdot mH_2O \quad (1)$$

wherein $M_1^{2+}$ represents Ca and/or Mg, $M_2^{2+}$ represents Fe and at least one essential mineral selected from the group consisting of Mn, Zn, Cu, Ni and Co, $M^{3+}$ represents at least one trivalent metal, $A^{n-}$ represents an anion having a valence of n, x is a positive number in the range of 0<x<0.5, m is 0 or a positive number in the range of 0≦m<10, z is a positive number in the range of 0<z<0.4, and n is a positive number in the range of 1≦n≦10, and/or the formula (2), $$(M_1^{2+})_{1-x}(M_2^{2+})_x(OH)_2 \quad (2)$$

wherein $M_1^{2+}$, x and $M_2^{2+}$ are as defined in the formula (1), the method comprising adding 0.1 g to 1,000 g of the nitrate-nitrogen-reducing agent per 1m$^2$ of soil.

* * * * *